(12) United States Patent
Padawer et al.

(10) Patent No.: US 7,046,994 B1
(45) Date of Patent: May 16, 2006

(54) SYSTEM AND METHOD FOR ASSOCIATING A CONTACT WITH A CALL ID

(75) Inventors: Andrew D. Padawer, Sammamish, WA (US); Jessie D. Tenenbaum, Seattle, WA (US); Peter G. Chin, Seattle, WA (US); Susan E. Pappalardo, Kirkland, WA (US); Robert P. St. Pierre, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 542 days.

(21) Appl. No.: 10/061,170

(22) Filed: Feb. 1, 2002

(51) Int. Cl.
*H01S 4/00* (2006.01)

(52) U.S. Cl. .................. 455/415; 379/93.23

(58) Field of Classification Search .......... 379/93.23, 379/357.01, 355.01; 707/10, 4, 6; 704/246, 704/251
See application file for complete search history.

(56) References Cited

U.S. PATENT DOCUMENTS

| | | | |
|---|---|---|---|
| 4,811,407 A * | 3/1989 | Blokker et al. ............. | 382/222 |
| 5,485,373 A * | 1/1996 | Davis et al. ................. | 715/536 |
| 5,533,110 A | 7/1996 | Pinard ......................... | 379/201 |
| 5,657,378 A | 8/1997 | Haddock et al. ......... | 379/93.23 |
| 5,724,412 A | 3/1998 | Srinivasan ............... | 379/93.23 |
| 5,754,636 A | 5/1998 | Bayless et al. ............. | 379/142 |
| 5,799,068 A | 8/1998 | Kikinis et al. ........... | 379/93.06 |
| 5,974,468 A | 10/1999 | Taylor et al. ................ | 709/302 |
| 6,009,469 A | 12/1999 | Mattaway et al. .......... | 709/227 |
| 6,014,137 A | 1/2000 | Burns ......................... | 345/334 |
| 6,049,334 A | 4/2000 | Bates et al. .................. | 345/332 |
| 6,134,017 A | 10/2000 | Schlank et al. ............. | 357/1.15 |
| 6,192,118 B1 | 2/2001 | Bayless et al. ............. | 379/201 |
| 6,208,879 B1 | 3/2001 | Iwata et al. ................. | 455/566 |
| 6,389,124 B1 | 5/2002 | Schnarel et al. ........ | 379/142.01 |
| 6,397,078 B1 * | 5/2002 | Kim ........................ | 455/556.2 |
| 6,421,672 B1 * | 7/2002 | McAllister et al. ........... | 707/10 |
| 6,512,819 B1 * | 1/2003 | Sato et al. ................ | 379/93.23 |

FOREIGN PATENT DOCUMENTS

| | | | |
|---|---|---|---|
| JP | 02000253373 | * | 9/2000 |
| WO | WO 96/02049 | | 1/1996 |

OTHER PUBLICATIONS

Frazier, "Pliug-in for Graphics Apps Adds Power to Special Effects," Government Computer News, vol. 16, No. 26, pp. 36-37, Sep. 1, 1997.

(Continued)

*Primary Examiner*—Ovidio Escalante
*Assistant Examiner*—Ming Chow
(74) *Attorney, Agent, or Firm*—Merchant & Gould PC

(57) ABSTRACT

This invention is directed toward a computer-implemented system and method for associating a contact with a telephone number. The method includes determining a set of candidate contacts from within a contact information database related to the telephone number, searching the set of candidate contacts for a matching contact and displaying a rich display of contact-related information obtained from the matching contact. In addition, the method may include linking to the contact-related information. Identifying the set of candidate contacts includes performing a Boyer Moore fast approximation. In addition, a tail end match may be performed to determine whether one of the candidate contacts matches the call ID.

21 Claims, 7 Drawing Sheets

OTHER PUBLICATIONS

Amadio, "Phone Ahead: A New Breed of High Tech Telephones Makes Doing Business Easier Than Ever," Entrepreneur, vol. 25, No. 12, pp. 56-58, Nov. 1997.
"Cool Stuff '98," Computerworld, vol. 31, No. 51, pp. 62-67, Dec. 22, 1997.
Rupley, "Feed Your E-mail Addiction," PC Magazine, vol. 16, No. 2, p. 10, Jan. 21, 1997.
"Uniden Spins Axis E-mail Telephone," PC Week, vol. 13, No. 45, p. 47, Nov. 11, 1996.
Bowles et al., "US West Brings Displa-Based Telephone to Residential Customers with Norel System," Telecommunications, vol. 30, No. 3, p. 82, Mar. 1996.
Kopf, "Perking Consumer Internet Internet Use: Are Java-Powered Screen Phones the Answer?" America's Network, vol. 100, No. 12, pp. 108-110, Jun. 15, 1996.
Davey, "Nortel Dialing Up Web Phones," PC Week, vol. 13, No. 21, p. 10, May 26, 1996.
"Getting Results with Microsoft Office 97," Microsoft Corporation, pp. 113-126 and 348-352, 1997.
"OL97: How to Add an Address to Your Contacts Folder from an E-Mail Message," http://support.Microsoft.com/support/kb/articles/Q258/6/17.ASP?LN=EN-US&SD=gnFR=0&, p. 1, 2001.
Doan, "Add-ins Give Outlook a Boost," InfoWorld, vol. 19, No. 32, p. 26, Aug. 11, 1997.
"Outlook Frequently Asked Questions," http://www.usi.edu.usihelp/outhelp/cntctfaq.htm, pp. 1-3, last modified Mar. 1, 1999.
"Press Releases Archive, Jan. 9, 1997," p. 1-2, http://www.news.Philips.com/archief/199701092.htm, Jan. 9, 1997.
"Tek Discount Warehouse," P. 1-2, http://www.discountwarehouse.com/tekgallery/norpow350.html.
"Teleport 33.6 Speakerphone Edition, User's Guide," pp. 1-105, Global Village Communication, Inc., 1996.
"CIDCO iPhone Introduction,"p. 1, http://www.cidco.com/iphone/intro2.html, accessed on Feb. 10, 1999.
"Alcatel Telecom—One Touch," p. 1-2, http://www.alcatel.com/telecom/mbd/products/products/detailed/term/otouch.htm, accessed on Feb. 16, 1999.
"Alcatel Telecom—Technical Specs," pp. 1-2, http://www.alcatel.com/telecom/mbd/products/products/detailed/term/tech.htm, accessed on Feb. 16, 1999.
Alacatel's Internet Screenphone Based on Sun's PersonalJava™ and JavaOS for Consumers™ Wins CeBIT Oscar Best Communications Product 1998, pp. 1-2, http://www.sun.com/javaos/consumers/press4.98.html, accessed on Feb. 16, 1999.
"CIDCO and Sun Announce Licensing Agreement Intended to Create New Consumer Internet Appliances Based on JavaOS for Consumers™ Software," pp. 1-4, http://www.sun.com/javaos/consumers/press4.98.html, accessed on Feb. 16, 1999.
"Southwestern Bell Catalog," pp. 1-2, http://www.swbell.com/, accessed on Feb. 10, 1999.
"Uniden's Axis Telephone Terminal" pp. 1-2, http://www.uniden.com/au.
"Alternative Web Access Via TV and Telephone," pp. 1-4, http://pimall.com/nais/n.ephone.html.
"This is the *Cordless Version* of Your Mother's Email Machine," pp. 1-2, http://www.telephone-guys.com/axis2.htm.
"Powertouch 350 Kit Charcole Specification," p. 1, http://www.gy.com/spec/uxaj.htm.
"Northern Telecom PowerTouch 350," pp. 1-2, http://www.commonsource.com/ntpt350.html.
"BellSouth Telephone Products," pp. 1-3, http://www.bellsouth.com/blsc/maestro.html, 1997.
"PowerTouch," p. 1, http://itlsc.gte.com/power.htm.
"PowerTouch Specifications," pp. 1-3, http://itlsc.gte.com/ptspec.htm.
"PowerTouch Phones," p. 1, http://widts.gte.com/Shopping/pwrtch.htm, 1999.
"AT & T Personal Communications Center User Guide," Graphics © AT&T, 1995.

* cited by examiner

SYSTEM AND METHOD FOR ASSOCIATING A CONTACT WITH A CALL ID

FIELD OF THE INVENTION

This invention relates generally to mobile computing, and more particularly to caller identification within a mobile electronic device.

BACKGROUND OF THE INVENTION

Manufacturers are continually adding additional applications to mobile communication devices, such as mobile telephones, in order to meet an increasing demand for a multi-functional device. For example, mobile telephones are increasingly becoming more than just wireless voice communication devices. Rather, in addition to handling voice data, some mobile telephones have a display unit to display graphical data to support email, Web browsing, and other non-voice features.

Similarly, manufacturers of mobile computing devices, such as personal digital assistants (PDAs), continue to add communication features to their computing devices. For example, PDAs that are currently available have features that enable them to have a data communication link with the Internet for sending and receiving emails, browsing the web, and so on.

Presently, a few manufacturers have attempted to advance mobile electronic device technology one step further by combining the features of a PDA with the features of a mobile telephone. These PDA/mobile telephone devices consolidate the mobile electronic device package by combining two devices into one. However, the application programs for the mobile telephone features often operate independently from the application programs for the PDA features. As a result, the advantage of a PDA/mobile telephone device is still somewhat confined to merely a physical consolidation of two mobile electronic devices.

SUMMARY OF THE INVENTION

This invention is directed at a computer-implemented system and method for associating a contact with a telephone number (e.g., call id). The telephone number may be obtained from an incoming call or from an outgoing call. In accordance with the present invention, the mobile telephone feature (e.g., caller identification) operates in conjunction with the PDA features (e.g., contact information) to provide an intelligent mobile device (e.g., a smart phone). The mobile device provides a rich set of information for display on the mobile device. In addition, the mobile device provides an efficient method for correlating contact information with a call id.

The method includes retrieving a call ID related to a calling party of a phone call, determining a set of candidate contacts from within a contact information database based on the call ID, searching the set of candidate contacts for a matching contact, and displaying a rich display of contact-related information. The contact-related information is obtained from the matching contact in the contact information database. The rich display is displayed on a mobile device that may have a touch sensitive keypad. The phone call may be an inbound or an outbound phone call. The rich display may include a company name, a thumbnail picture of an individual associated with the matching contact, and a type for the phone number (e.g., home, business, etc).

In another aspect of the invention, the set of candidate contacts may be created by performing a Boyer Moore fast approximation on each contact within the contact information database with respect to the call ID. Each contact may have several fields that are considered. In a further refinement of the invention, the matching contact is identified by performing a tail end match.

In yet another aspect of the invention, the method may include linking from the rich display to the contact-related information.

DETAILED DESCRIPTION OF THE PREFERRED EMBODIMENT

This invention is directed toward a computer-implemented system and method for associating a contact with a telephone number. The method includes determining a set of candidate contacts from within a contact information database related to the telephone number, searching the set of candidate contacts for a matching contact and displaying a rich display of contact-related information obtained from the matching contact. In addition, the method may include linking to the contact-related information. These and other aspects of the invention will become apparent to those skilled in the art from the following detailed description.

Illustrative Mobile Electronic Device Implementing the Present Invention

Figure 1:
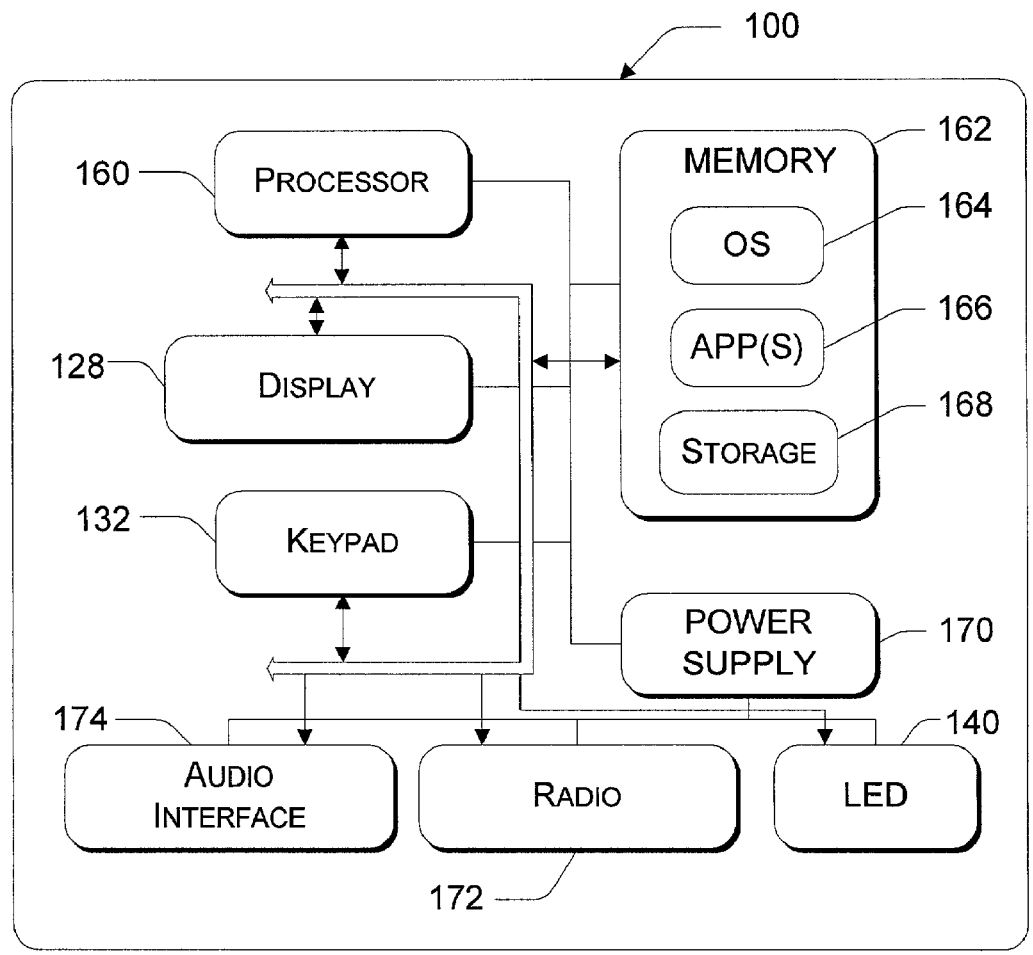
FIG. 1 illustrates an exemplary mobile computing device that may be used in one exemplary embodiment of the present invention.

FIG. 1 illustrates an exemplary mobile computing device, such as mobile device 100, adapted for use in one implementation of the present invention. Mobile device 100 has a processor 160, a memory 162, a display 128, and a keypad 132. Memory 162 generally includes both volatile memory (e.g., RAM) and non-volatile memory (e.g., ROM, Flash Memory, or the like). Mobile device 100 includes an operating system 164, which is resident in memory 162 and executes on processor 160. Keypad 132 may be a push button numeric dialing pad (such as on a typical telephone), a multi-key keyboard (such as a conventional keyboard). Display 128 may be a liquid crystal display, or any other type of display commonly used in mobile computing devices. Display 128 may be touch-sensitive, and would then also act as an input device.

One or more application programs 166 are loaded into memory 162 and run on operating system 164. Examples of application programs include phone dialer programs, e-mail programs, scheduling programs, PIM (personal information management) programs, word processing programs, spreadsheet programs, Internet browser programs, and so forth. Mobile device 100 also includes non-volatile storage 168 within the memory 162. Non-volatile storage 168 may be used to store persistent information which should not be lost if mobile device 100 is powered down. The applications 166 may use and store information in storage 168, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 168 synchronized with corresponding information stored at the host computer.

Mobile device 100 has a power supply 170, which may be implemented as one or more batteries. Power supply 170 might further include an external power source, such as an AC adapter or a powered docking cradle that supplements or recharges the batteries.

Mobile device 100 is also shown with two types of external notification mechanisms: an LED 140 and an audio interface 174. These devices may be directly coupled to power supply 170 so that when activated, they remain on for a duration dictated by the notification mechanism even though processor 160 and other components might shut down to conserve battery power. LED 140 may be programmed to remain on indefinitely until the user takes action to indicate the powered-on status of the device. Audio interface 174 is used to provide audible signals to and receive audible signals from the user. For example, audio interface 174 may be coupled to a speaker for providing audible output and to a microphone for receiving audible input, such as to facilitate a telephone conversation.

Mobile device 100 also includes a radio 172 that performs the function of transmitting and receiving radio frequency communications. Radio 172 facilitates wireless connectivity between the mobile device 100 and the outside world, via a communications carrier or service provider. Transmissions to and from the radio 172 are conducted under control of the operating system 164. In other words, communications received by the radio 172 may be disseminated to application programs 166 via the operating system 164, and vice versa.

The radio 172 allows the mobile device 100 to communicate with other computing devices, such as over a network. The radio 172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
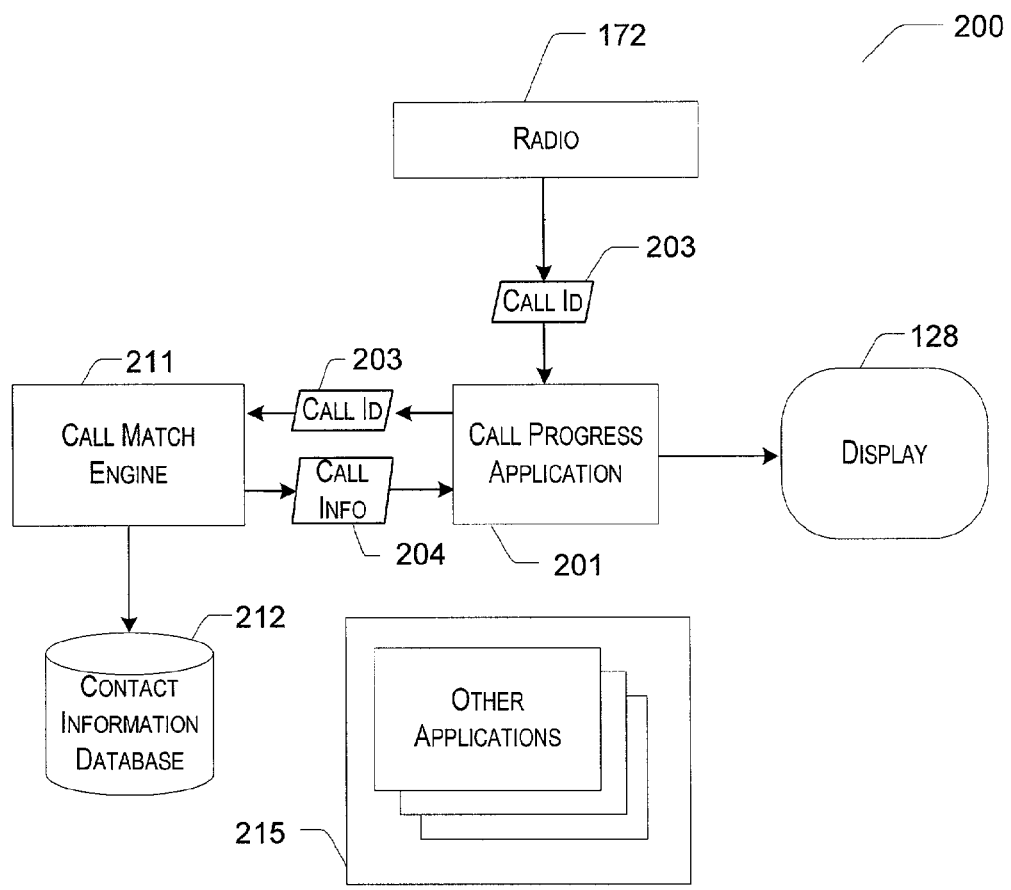
FIG. 2 is a functional block diagram of one exemplary call ID match system as implemented on the mobile computing device shown in FIG. 1.

FIG. 2 is a functional block diagram of one exemplary call ID match system 200 as implemented on the mobile device 100 shown in FIG. 1. This implementation of the invention is described in the general context of computer-executable instructions or components, such as software modules, being executed on a mobile computing device. Generally, software modules include routines, programs, objects, components, data structures, and the like that perform particular tasks or implement particular abstract data types. Although described here in terms of computer-executable instructions or components, the invention may equally be implemented using programmatic mechanisms other than software, such as firmware or special purpose logic circuits.

With reference to FIG. 2, when a call is connected, whether incoming or outgoing, the radio 172 initiates the communication with call connection software, such as a call handling application (not shown) executing on the mobile device 100. Typically, call identification information (call ID) 203 is included with the communication data for the call. Typically, the call ID 203 includes at least the calling phone number of the current call. The call ID 203 may additionally include the name of the calling party, although generally wireless communications do not include the name. In addition, the call ID 203 received from wireless providers varies in its format between the wireless providers.

Figure 3:
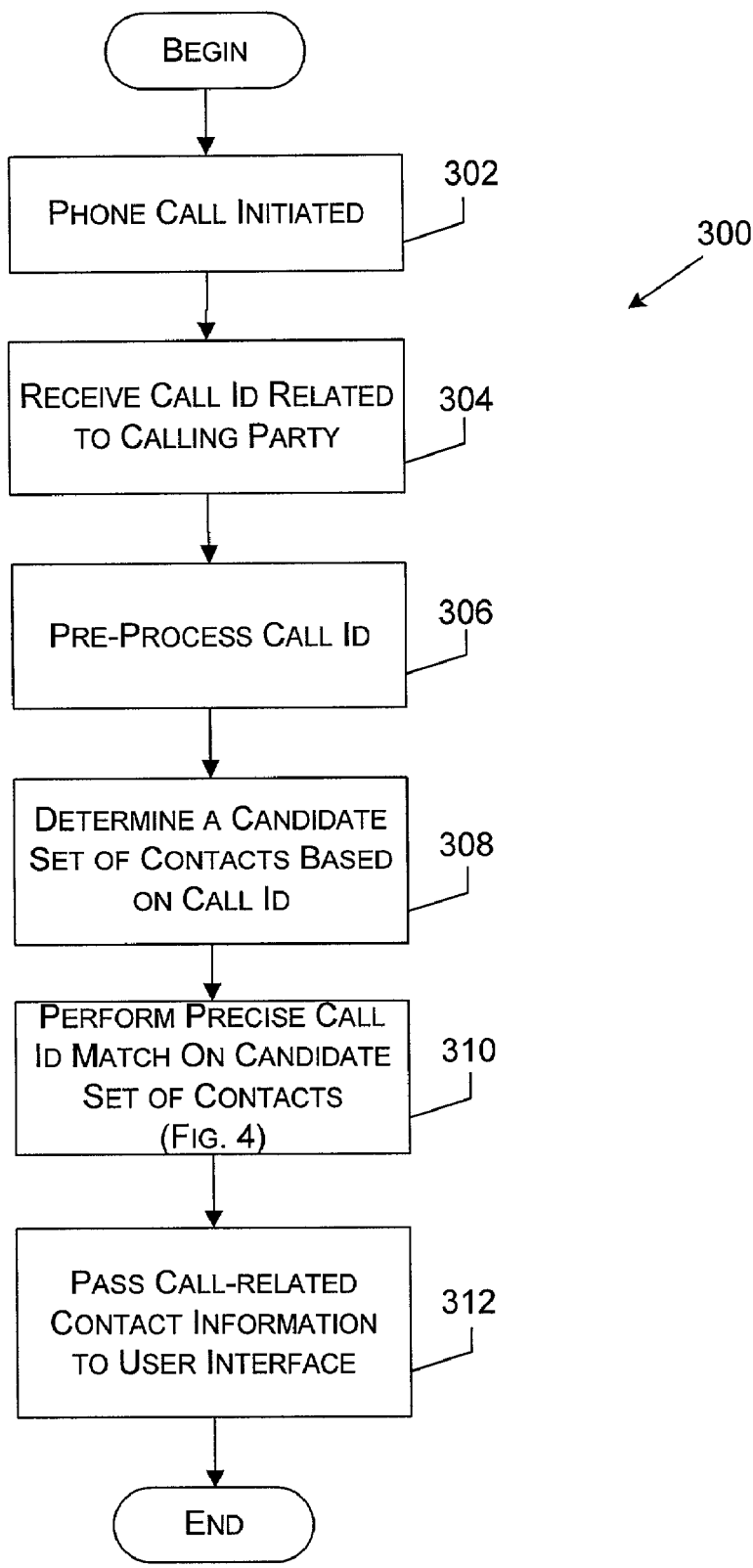
FIG. 3 is a logical flow diagram summarizing a process for associating a contact with a caller id.
Figure 4:
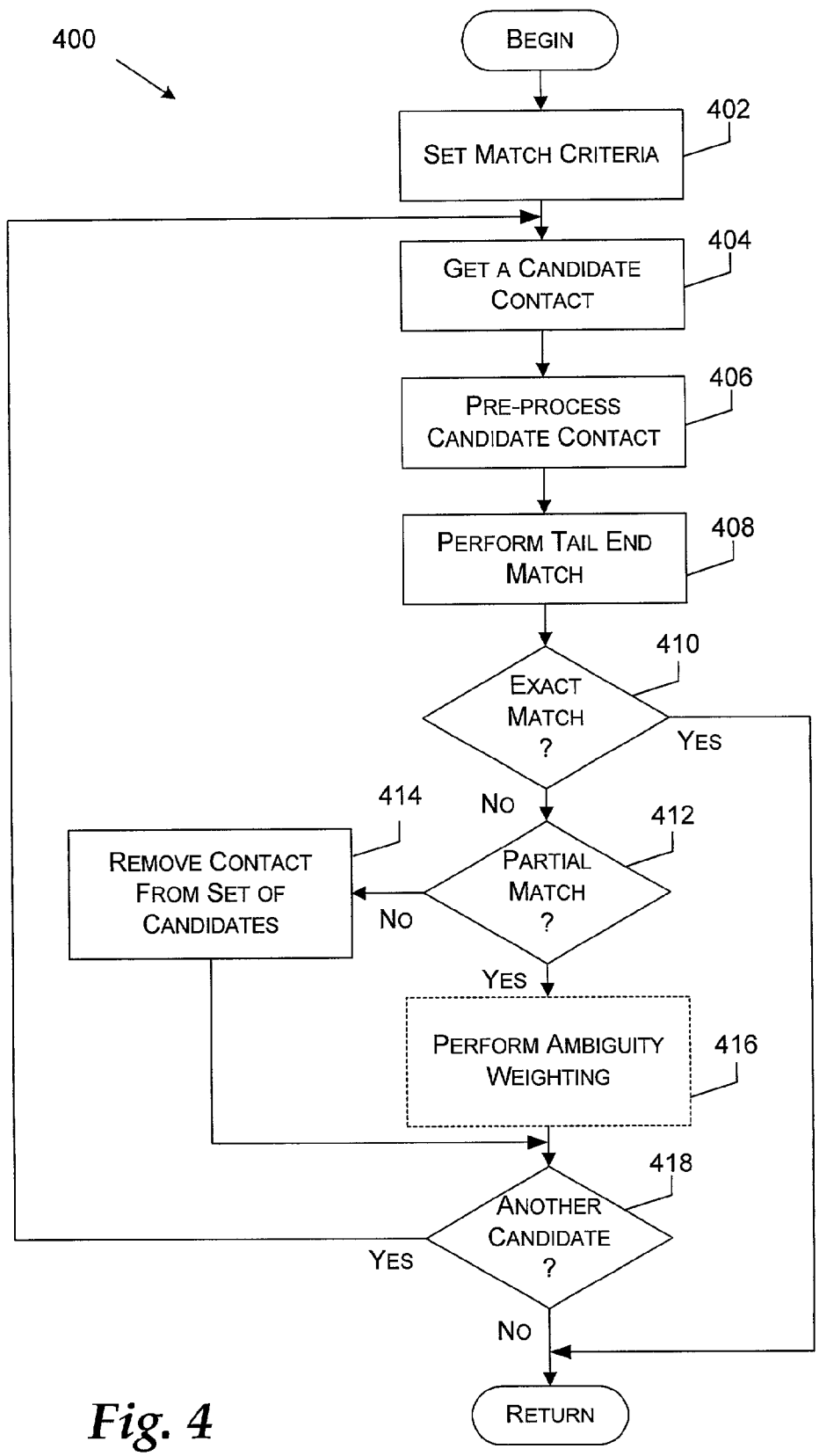
FIG. 4 is a logical flow diagram illustrating an exemplary contact matching process suitable for use in FIG. 3.

When received from the radio 172, the call handling application passes the call ID info 203 to a call progress application 201, which is an application responsible for maintaining a user interface on the display 128. The call progress user interface is illustrated in detail in FIGS. 5–7 and described below. Briefly described, the call progress application 201 may display the call ID 203 in conjunction with other call-related information or may display only the other call-related information if more pertinent. In addition, the call progress application 201 may invoke additional processes, such as call match engine 211, which provides processing for matching the call ID 203 to an associated name. The call match engine 211 may operate as a separate processing thread. Details of the call match engine 211 is illustrated in FIGS. 3–4 and described below.

Briefly described, the call match engine 211 queries a contact information database 212 to determine if any stored contacts include the call ID associated with the calling phone number. If so, the associated name and other call-related information from the contact information database may be displayed in lieu of the calling phone number. The call match engine 211 may also operate when the phone number is an outgoing phone number. In this case, the call progress application 210 receives an outgoing phone number from another source, such as a contact manager or speed dialer (not shown). The outgoing phone number is then considered the call ID 203.

The contact information database 212 contains information related to a contact, such as work address, work fax number and the like. This information may be organized into data fields with the contact information database 212. The contact information database 212 may be updated through keypad 132, through a touch-sensitive display 128, and/or through synchronization methods with the corresponding synchronization application resident on the host computer. Because the contact information database 212 may be updated so efficiently, the contacts information database 212 of the present invention stores a considerable larger number of contacts than current mobile telephones. Thus, the call match engine 211, in accordance with the present invention, performs a search that rivals the search speed of a mobile telephone having only a limited number of contacts.

For the purpose of the following discussion, all information related to the current call (e.g., call ID, call-related information and the like) will be referred to as call-related information 204. Thus, the call progress application 201 may display a rich set of call-related information 204, such as a company name and company address associated with the identified contact.

FIG. 3 is a logical flow diagram summarizing a process for associating a contact with a caller id. The process 300 begins at block 302, where a phone call is initiated at a mobile device. The phone call may be either inbound or outbound. As is known in the art, the data transmitted during a phone call typically includes both voice data and metadata describing the phone call, such as the calling party's phone number and possibly the calling party's name.

At block 304, the metadata (call ID data) describing the current phone call is received at a first application, such as a call progress application responsible for presenting a user interface on the mobile electronic device.

At block 306, the call ID data is pre-processed so that the call ID data is ready for matching. Pre-processing may include stripping extraneous characters from the call ID data, such as parenthesis and dashes. For example, the call ID data of +1(425) 555-1212 may be pre-processed to +14255551212. In another example, the leading "0" used for telephone numbers in certain countries (e.g., Taiwan) may be removed. The list of extraneous characters that needs to be removed is configurable through the keypad.

At block 308, a candidate set of contacts is determined based on the call ID data. As mentioned above, the contact information database may store several contacts. Therefore, the determination of the candidate set of contacts is performed efficiently and effectively to minimize the number of contacts input into a more precise search (block 310). In one embodiment, a Boyer Moore fast approximation is performed. An ignore set is created that specifies which characters within a string may be ignored when determining the candidate set of contacts. For example, the ignore set may list "+", "(",")" "-", and others as characters to disregard when determining the candidate set. Once a minimal match is found within one field of a particular contact, other fields of the particular contact are not necessarily processed. In one illustrative outcome, the determination of the candidate set of contacts reduces 1000 contacts to 5 contacts of interest for the candidate set.

The fast approximation is performed for each contact. Once any of the relevant fields (i.e., home number, office number, and mobile number) in a contact has a sufficient match (e.g., 7 numbers out of 10), the contact is added to the candidate set of contacts. Further processing on the contact need not be performed to determine whether one of the other relevant fields contains a better match. In addition, in one embodiment, the fast approximation will add the contact to the candidate set without determining whether the contact could have been an exact match.

At block 310, a precise call ID match process is performed using the candidate set of contacts. The precise call ID match is illustrated in FIG. 4 and described below. Briefly, the precise call ID match attempts to exactly match the call ID with one of the contacts in the contact information database. If an exact match can not be found, the precise call ID match performs varies degrees of matching. In addition, the precise call ID may perform ambiguity weighting to increase the confidence of the matching.

Figure 5:
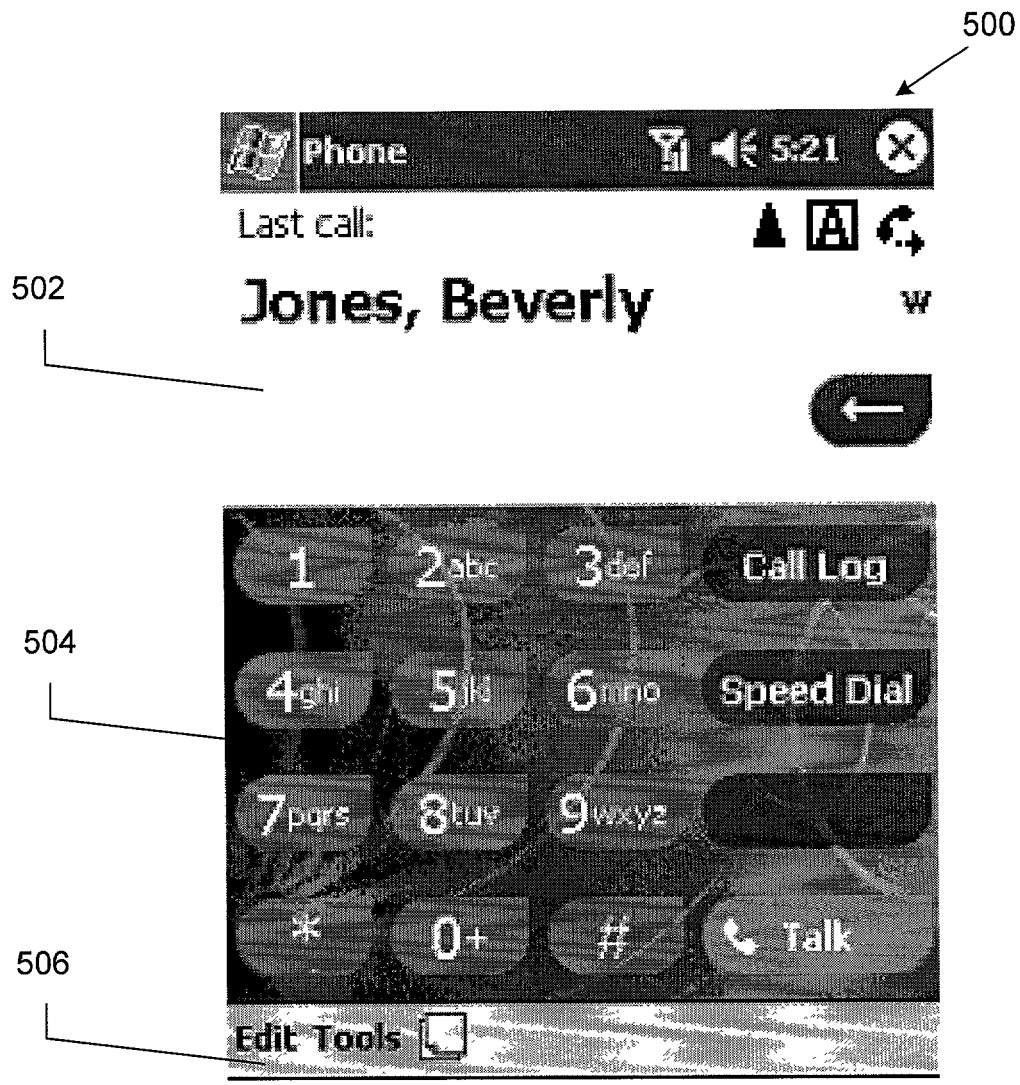
FIG. 5 is a diagram illustrating an exemplary user interface display for the mobile electronic device.
Figure 6:
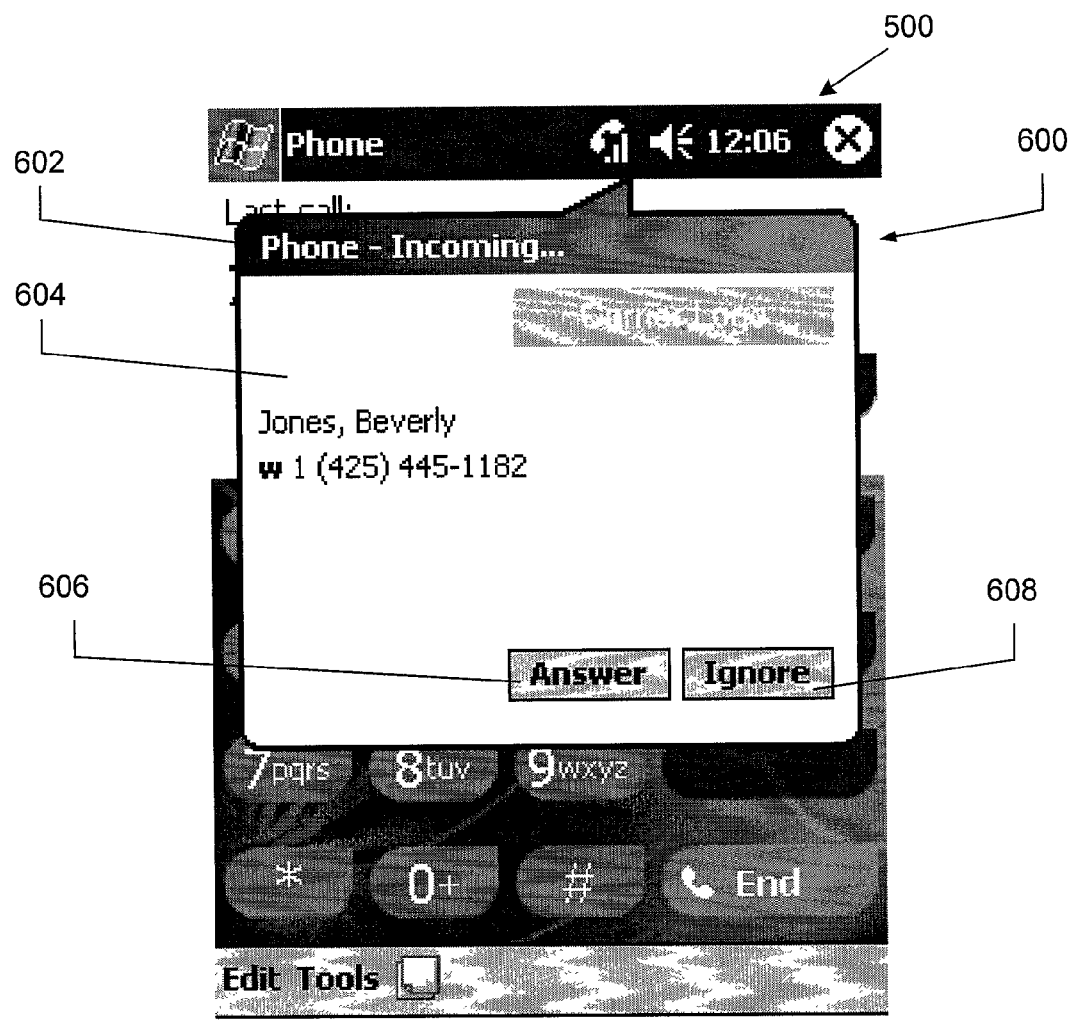
FIG. 6 is a diagram illustrating another exemplary user interface display for displaying associated call-related contact information when an incoming call is received.
Figure 7:
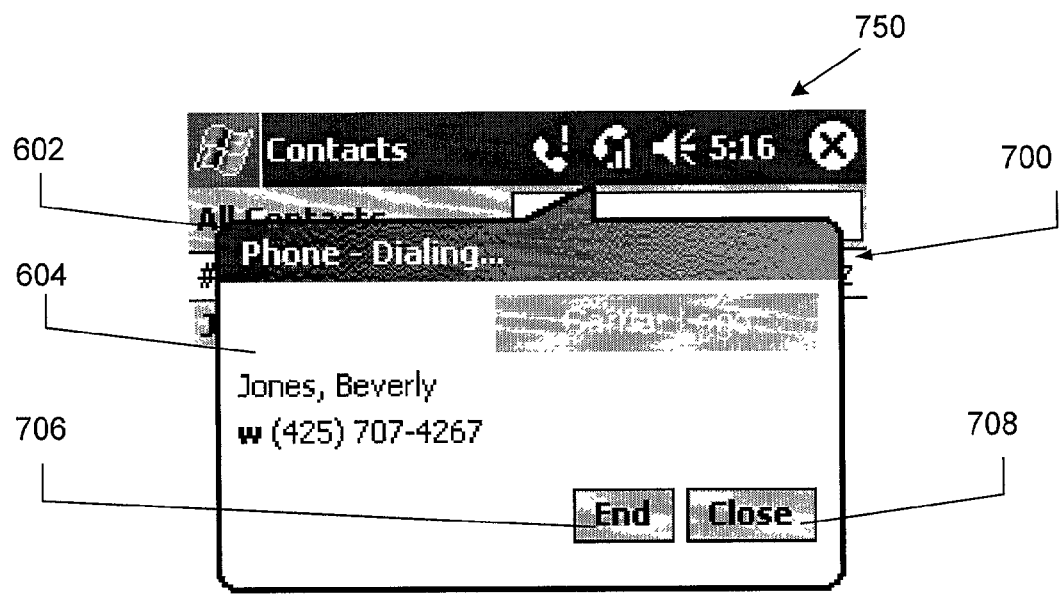
FIG. 7 is a diagram illustrating yet another exemplary user interface display for displaying associated call-related contact information when an outgoing call is placed.
Figure 7:

At block 312, the precise call ID match passes call-related contact information to the user interface for display. The call-related contact information is associated with the contact that is matched with the call ID. Exemplary user interfaces are illustrated in FIGS. 5–7 and described below. Briefly, the user interface provides a rich set of information obtained from the contact information database. In addition, the user interface may provide a hot link to a contact card within the contact information database by selecting (e.g., tapping) the display name associated with the call ID. In addition, the user interface may provide a tap and hold context menu that contains items, such as 'View Contact', 'Send SMS', 'Call' and others. The items contained in the context menu may depend on the state of the call (e.g., whether a call is in progress). The call ID engine may pass the call-related contact information to the call progress application using a handle to the contact. The call ID engine may also pass the call progress application a contact record number. Based on the call-related contact information, the display may show various information, such as the name of the contact, the phone number of the contact, the name of the business, and the like. In another embodiment, the display may show a thumbnail picture of the contact, and/or a corporate logo. The call progress application may play a voice tag, sound a customized ring tone and the like based on the call-related contact information. This completes the process 300.

FIG. 4 is a logical flow diagram illustrating an exemplary contact matching process suitable for use in FIG. 3. The process 400 begins at block 402, where a candidate set of contacts is available. The process sets match criteria that will be used during the precise call ID match process 400. The match criteria enforce the minimum number of numbers in the call ID that should match before the associated contact is considered a match.

At block 404, one of the candidate contacts is retrieved. The number of candidate contacts may vary depending on the results of the fast approximation match. Because each candidate contact may have several relevant fields that need to be searched, it is desirable to have fewer than twenty candidate contacts.

At block 406, each of the relevant fields in the candidate contact is pre-processed. Pre-processing the candidate contact may include stripping extraneous characters and the like.

At block 408, a tail end match is performed. The tail end match begins with the right-most number in the telephone number and proceeds to the left-most number. If the match criterion is met, the tail end match may continue to check for an exact match with the call ID.

At decision block 410, a determination is made whether the candidate contact is an exact match. If the candidate contact is not an exact match, processing may continue at decision block 412.

At decision block 412, a determination is made whether the candidate contact is a partial match. If the candidate contact is not a partial match, the process continues at block 414, where the contact is removed from the set of candidate contacts. Processing continues at decision block 418, where a determination is made whether there is another candidate contact in the set of candidates. If there is another candidate contact, processing loops back to block 404 and proceeds as described above with a new contact. If there are no more candidate contacts in the set, processing is complete.

Returning to decision block 412, if the candidate contact is a partial match, processing may continue at block 416, where ambiguity resolution is performed. Ambiguity resolution may involve application of various heuristics. For example, heuristics may be used to handle inconsistencies in the call ID 203 that was provided by the communication media to the radio 172. As a further refinement, each match may be given a weighting that indicates the confidence level of the match. The operation at block 416 is optional (as indicated by the dashed line box) and may be omitted in some embodiments of the invention.

When ambiguity weighting is performed, the process attempts to increase the confidence that the identified contact is in fact the contact associated with the call ID. The process uses information obtained from relevant fields in the candidate contact to determine the confidence. The information may include the length of the match, where the match occurred (i.e., outgoing call log, speed dial, contacts, etc), format of the match, the relevant field that was matched (i.e., home, work, cell, fax, etc). This and other information may be combined into a weight. Then, the call-related information passed to the display may include a probability that the caller is the matched contact. In addition, the display may show two matched contacts, along with corresponding probabilities for both matched contacts. The probabilities reflect the likelihood of the two matched contacts being the actual caller. In another embodiment, the probabilities of any matched contacts may be indicated on the display using a visual indicator (e.g., different color, by order). Once ambiguity weighting has been performed, processing continues at decision block 418 and proceeds as described above.

Returning to decision block 410, if the candidate contact is an exact match, processing is complete. In another embodiment, processing may continue with block 416, where ambiguity weighting is performed as described above. In this embodiment, if multiple contacts match the call ID (e.g., the call ID is an office's main line), the ambiguity weighting will determine which contact has the highest probability of being the actual match. Thus, in this embodiment, all the contacts in the set of candidate contacts are processed, even if there is an exact match found.

In the event that none of the candidate contacts are an exact match or meet the match criteria, the call ID engine may not deliver any call-related information to the display. Thus, the display may then display the telephone number as received by the call ID. This completes the process 400.

FIG. 5 is an illustrative display 128 illustrating a sample user interface 500 that may be presented by the call progress application 201. The user interface 500 includes an information area 502, a keypad 504, and a tool bar 506. The information area 502 may present pertinent information regarding a phone call. For example, the information area 502 illustrated in FIG. 5 displays that the last outgoing call was to Beverly Jones. The information area 502 may also present other information, such as the number dialed, the status of the call, etc. Keypad 504 allows entry of an outgoing telephone number. In one embodiment, the information area 502, the keypad 504 and the tool bar 506 reside on a touch-sensitive display.

FIG. 6 is a diagram illustrating an exemplary incoming call notification display 600 for displaying call-related contact information when an incoming call is received. As shown, the incoming call notification display 600 may overlay the exemplary user interface 500. The incoming call notification display 600 includes a call status bar 602, a call-related information area 604, and selection buttons (e.g., answer button 606 and ignore button 608). The call-related information area 604 may include any information from the contact information database associated with the contact that was matched. For example, FIG. 6 illustrates that the incoming call is from a Beverly Jones, the telephone number is a work number, and the number is "1 (425) 445-1182". The call-related information area 604 may also include a company name associated with the contact, a thumbnail picture of the person identified by the contact, and the like. The selection buttons 606 608 allow a mobile device user the ability to choose whether to answer the call or whether to ignore the call. The selection buttons 606 608 may also include other types of buttons, such as a wait button that delays the answering of the incoming call until the user is able to answer. In one illustrative example, the wait button may be selected by a user watching a movie in a theater to delay answering the phone until the user is in the theater lobby.

FIG. 7 is a diagram illustrating an exemplary outgoing call notification display 700 for displaying call-related contact information when an outgoing call is placed. As shown, the outgoing call notification display 700 may overlay an associated display 750. In FIG. 7, the associated display 750 relates to a contact entry (e.g., contact list). Similar to the incoming notification display, the outgoing call notification display 700 includes a call status bar 602, a call-related information area 604, and selection buttons (e.g., end button 706 and close button 708). Again, the call-related information area 604 may include any information from the contact information database associated with the contact that was matched. For example, FIG. 7 illustrates that the outgoing call is to a Beverly Jones, the telephone number is a work number, and the number is "1 (425) 707-4267". The call-related information area 604 may also include a company name associated with the contact, a thumbnail picture of the person identified by the contact, and the like. The selection buttons 706 708 allow a mobile device user the ability to choose whether to end the call and whether to close the outgoing call notification display. As explained above, the selection buttons 706 708 may also include other types of buttons.

The above specification, examples and data provide a complete description of the invention. Since many embodiments of the invention can be made without departing from the spirit and scope of the invention, the invention resides in the claims hereinafter appended.

We claim:

1. A method for associating a call ID with a contact on a mobile device, comprising:
   retrieving the call ID related to a calling party of a phone call;
   determining a candidate set of contacts from a contact information database based on the call ID, wherein:
      the candidate set of contacts comprises contacts that correspond to the call ID according to a criteria, and
      the criteria identifies a minimum number of characters in the call ID that are used to identify a corresponding contact in the candidate set of contacts;
   identifying at least one contact that corresponds to the call ID by comparing the minimum number of characters in the call ID to at least one data field of each contact in the candidate set of contacts;
   identifying call-related contact information associated with each identified contact;
   calculating an ambiguity weight factor for each identified contact based on information associated with each identified contact, wherein:
      the ambiguity weight factor identifies a probability that the identified contact corresponds to the call ID, and
      the information comprises at least one of: the minimum number of characters in the call ID used to identify the corresponding contact and the type of at least one data field of the identified contact that is compared to the minimum number of characters of the call ID; and passing the call-related contact information and the ambiguity weight factor for each identified contact to a user display on a mobile device.

2. The method of claim 1, wherein the phone call includes an inbound phone call from the calling party.

3. The method of claim 1, wherein the phone call includes an outbound phone call to the calling party.

4. The method of claim 1, further comprising preprocessing the call ID to remove extraneous characters from the call ID.

5. The method of claim 1, wherein determining the candidate set of contacts further comprises performing a Boyer Moore fast approximation on the at least one data field of each contact in the contact information database, the contact being added to the candidate set of contacts if the corresponding at least one data field corresponds to the call ID according to the criteria.

6. The method of claim 1, wherein identifying at least one contact that corresponds to the call ID further comprises performing a tail end match of the call ID with the at least one data field of each contact in the candidate set of contacts.

7. The method of claim 6, further comprising removing extraneous characters from the call ID and information contained within the at least one data field of the contact before performing the tail end match.

8. The method of claim 1, further comprising displaying a visual indicator on the user display that corresponds to the ambiguity weight factor.

9. The method of claim 1, further comprising displaying the call-related contact information on the user display.

10. The method of claim 1, wherein the call-related contact information includes at least one of: a company name associated with the identified contact, a thumbnail picture of an individual associated with the identified contact, and a type of phone number associated with the phone call.

11. The method of claim 1, further comprising displaying a hot link on the user display, wherein the hot link provides a link to the call-related contact information.

12. A computer-readable medium encoded with computer-executable components, comprising:
a fist component that is configured to receive a call ID associated with a caller; and
a second component that is configured to:
receive the call ID from the first component,
identify a candidate set of candidate contacts from a contact information database based on the call ID, wherein:
the candidate set of contacts comprises contacts that correspond to the call ID according to a criteria, and
the criteria identifies a minimum number of characters in the call ID that are used to identify a corresponding contact in the candidate set of contacts,
identify at least one contact in the candidate set of contacts that corresponds to the call ID by comparing the minimum number of characters in the call ID to at least one data field of each contact in the candidate set of contacts:
identify call-related contact information associated with each identified contact;
calculate an ambiguity weight factor for each identified contact based on information associated with each identified contact, wherein:

the ambiguity weight factor identifies a probability that the identified contact corresponds to the call ID, and
the information comprises at least one of: the minimum number of characters in the call ID used to identify the corresponding contact and the type of at least one data field of the identified contact that is compared to the minimum number of characters of the call ID, and
pass the call-related contact information and the ambiguity weight factor for each identified contact to the first component if one contact is identified that corresponds to the call ID;
wherein the first component is further configured to display the call-related contact information and the ambiguity weight factor on a user display on a mobile device.

13. The computer-readable medium of claim 12, wherein the call-related contact information includes at least one of; a company name associated with the identified contact, a company address associated with the identified contact, a type of phone number associated with the caller, and a thumbnail picture associated with the identified contact.

14. The computer-readable medium of claim 12, wherein the second component performs a Boyer Moore fast approximation on the at least one data field of each contact in the contact information database, further wherein the second component adds the contact to the candidate set of contacts if the corresponding at least one data field corresponds to the call ID according to the criteria.

15. The computer-readable medium of claim 12, wherein the second component identifies at least one contact in the candidate set of contacts by performing a tail end match.

16. The computer-readable medium of claim 15, wherein the tail end match results in an exact match.

17. The computer-readable medium of claim 15, wherein the tail end match results in a partial match.

18. A mobile device, comprising:
a processor;
a display;
a memory into which a plurality of instructions are loaded, the plurality of instructions performing a method comprising:
receiving a call ID associated with a caller;
identifying a candidate set of contacts from a contact information database based on the call ID, wherein:
the candidate set of contacts correspond to the call ID according to a criteria, and
the criteria identifies a minimum number of characters in the call ID that are used to identify a corresponding contact in the candidate set of contacts;
identifying at least one contact in the candidate set of contacts that corresponds to the call ID by comparing the minimum number of characters in the call ID to at least one data field of each contact in the candidate set of contacts;
identifying call-related contact information associated with each identified contact;
calculating an ambiguity weight factor for each identified contact based on information associated with each identified contact, wherein:
the ambiguity a weight factor identifies a probability that the identified contact corresponds to the call ID, and
the information comprises at least one of: the minimum number of characters in the call iD used to identify the corresponding contact a and the type of at least one data field of the identified contact that is compared to the minimum number of characters of the call ID; and displaying the call-related contact information and the ambiguity weight factor on the display of the mobile device.

19. The mobile device of claim 18, wherein the call-related contact information includes at least one of a company name associated with the identified contact, a company address associated with the identified contact, a type of phone number associated with the caller, and a thumbnail picture associated with the identified contact.

20. The mobile device of claim 18, wherein identifying the candidate set of contacts further comprises:

performing a Boyer Moore fast approximation on the at least one data field of each contact in the contact information database; and adding the contact to the candidate set of contacts if the corresponding at least one data field corresponds to the call ID according to the criteria.

21. The mobile device of claim 20, wherein identifying at least one contact in the candidate set of contacts further comprises performing a tail end match.

\* \* \* \* \*